United States Patent
Andrieux et al.

(10) Patent No.: US 8,276,442 B2
(45) Date of Patent: Oct. 2, 2012

(54) DEVICE AND METHOD FOR ESTIMATING THE INFLATION STATE OF A TIRE

(75) Inventors: Arnaud Andrieux, Hesdin (FR);
Christian Chabanon, Montigny le Bretonneux (FR)

(73) Assignee: Renault S.A.S., Boulogne Billancourt (FR)

(*) Notice: Subject to any disclaimer, the term of this patent is extended or adjusted under 35 U.S.C. 154(b) by 0 days.

(21) Appl. No.: 12/678,009

(22) PCT Filed: Sep. 12, 2008

(86) PCT No.: PCT/FR2008/051645
§ 371 (c)(1),
(2), (4) Date: Oct. 27, 2010

(87) PCT Pub. No.: WO2009/047431
PCT Pub. Date: Apr. 16, 2009

(65) Prior Publication Data
US 2011/0030464 A1   Feb. 10, 2011

(30) Foreign Application Priority Data
Sep. 12, 2007   (FR) .................................... 07 57523

(51) Int. Cl.
*B60C 23/02*   (2006.01)

(52) U.S. Cl. ...................................................... 73/146.3
(58) Field of Classification Search .......... 73/146–146.8
See application file for complete search history.

(56) References Cited

U.S. PATENT DOCUMENTS

| | | | |
|---|---|---|---|
| 7,263,458 B2 | 8/2007 | Hall et al. | |
| 2003/0030553 A1 | 2/2003 | Schofield et al. | |
| 2004/0133400 A1 | 7/2004 | Polzin | |
| 2005/0171723 A1 | 8/2005 | Koebe et al. | |
| 2008/0276699 A1* | 11/2008 | Edling et al. ................... | 73/146 |

FOREIGN PATENT DOCUMENTS

| | | |
|---|---|---|
| EP | 0 931 679 | 7/1999 |
| WO | 2007 020202 | 2/2007 |

* cited by examiner

*Primary Examiner* — Andre Allen
(74) *Attorney, Agent, or Firm* — Oblon, Spivak, McClelland, Maier & Neustadt, L.L.P.

(57) ABSTRACT

A device for estimating an inflation state of a tire of at least one wheel of an automobile, that includes a memory storing a reference signature including a periodic signal corresponding to an inflation and to reference running conditions; a mechanism determining a current signature including a periodic signal corresponding to an inflation and to current running conditions; a mechanism comparing the current signature and the reference signature, and capable of outputting a signal based on the deviation between the current signature and the reference signature.

11 Claims, 2 Drawing Sheets

DEVICE AND METHOD FOR ESTIMATING THE INFLATION STATE OF A TIRE

BACKGROUND

The field of application of the present invention is the safety of vehicles with tires, and more particularly the estimation of the inflation and the detection of blow-outs in said tires.

Patent application US 2004/0133400 describes a system and a method for estimating the inflation state of one of the four tires of a vehicle. Said method and system are limited by the computing, straight-line and constant speed conditions, with only one tire sustaining a loss of pressure. Similarly, the document does not disclose detection of a slow loss of pressure.

Patent application US 2005/0171723 describes a system for estimating the inflation state of a tire using a spectral analysis of the vibration modes of the tire between 20 and 40 Hz. The peak frequency thus obtained differs in frequency depending on the inflation state of the tire. The limitation of said estimation system are a variable difficulty in obtaining the required vibration mode, variable difficulty depending on whether the tire is a driving tire or not, the state of the pavement or the side of the pavement used.

International patent application WO 2005/005173 discloses a method and a system for determining the difference in the diameter of said tire relative to the expected diameter, and the study of the vibration of said tire. From these two information items, the method and the system determine the pressure of said tire. The determination method and system are active only on straight road sections and demand signal processing that is costly and difficult to apply.

The systems and methods described in the foregoing documents have serious limitations associated with the conditions of use. Notably, stable running conditions are required such as movement in a straight line, and a stable speed, limiting the utility of such systems on journeys that are frequently made. Moreover, certain cited methods and systems require a comparison between the state of the monitored tire and the state of at least one of the other tires. The result of this is that a simultaneous loss of pressure of the monitored tire and of the tires used as reference leads to a detection malfunction.

BRIEF SUMMARY

The subject of the present invention is a tire inflation estimation device, on board a vehicle, that is enhanced and notably does not require any sensor other than a speed sensor.

A further subject of the invention is a tire-inflation estimation device that does not operate on a comparison of the inflation state of at least two tires.

A further subject of the invention is the detection of a puncture in the tire of a vehicle fitted with a device as proposed.

A device for detecting the inflation state of a tire of at least one wheel of a motor vehicle comprises
  a memory containing a reference signature consisting of a periodic signal corresponding to an inflation and to reference running conditions,
  a means for determining a current signature consisting of a periodic signal corresponding to an inflation and to current running conditions,
  a means for comparing the current signature with the reference signature, capable of outputting a signal depending on a difference between the current signature and the reference signature.

The detection device may also comprise a sensor of the rotation speed of said wheel, furnished with angle markers and with a means for detecting said angle markers. The means for determining a current signature is capable of determining a signal depending on the inflation state of the tire, as a function of a signal received from the speed sensor and depending on the successive passage of the angle markers.

The means for comparing between the current signature and the reference signature may comprise a device for locating the angular position of the markers corresponding to the location of the detected pressure increase.

A method for detecting the inflation state of a tire of at least one wheel of a motor vehicle comprises steps during which:
  a reference signature is stored consisting of a periodic signal corresponding to an inflation and to reference running conditions,
  a current signature of a wheel is determined, consisting of a periodic signal corresponding to an inflation and to current running conditions,
  a difference between said current signature and the stored reference signature is determined,
  and the inflation state of the tire is deduced therefrom.

It is possible to determine the difference between the reference signature and the current signature by producing the point-to-point difference between the current signature and the reference signature.

It is possible to determine the difference between the current signature and the stored reference signature in real time.

The detection method may be applied to all of the tires of the vehicle. It is then possible to determine the difference between the current signature and the stored reference signature for each tire individually.

A puncture-detection signal can be transmitted if an isolated and time-limited increase in the difference between the reference signature and the current signature is detected.

The detection method may be applied to a vehicle fitted with studded tires. The reference signature then includes the contribution of the studs of the tire.

BRIEF DESCRIPTION OF THE DRAWINGS

Other objects, features and advantages will appear on reading the following description given only as a nonlimiting example and made with reference to the appended drawings in which.

DETAILED DESCRIPTION

Figure 1:
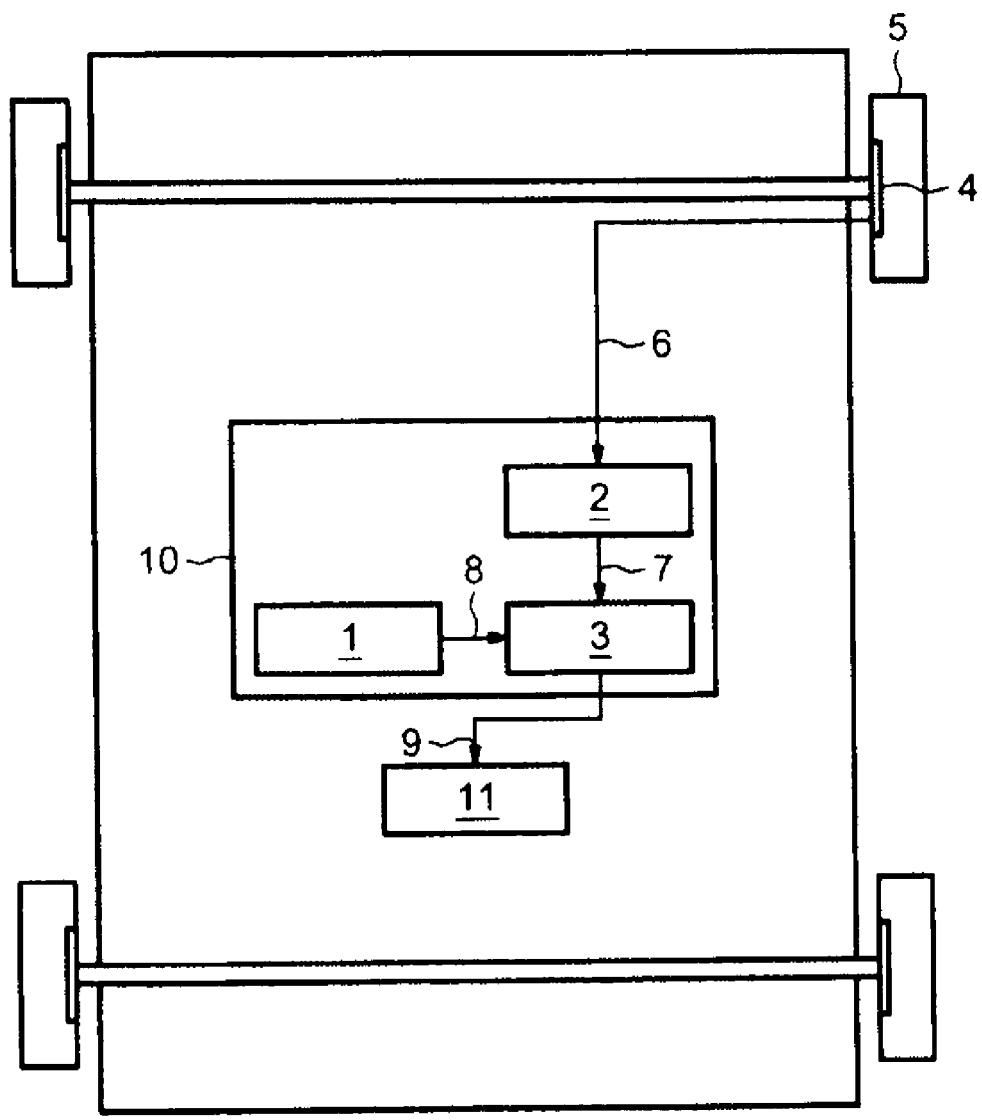
FIG. 1 illustrates the main members of a device for detecting the inflation state of a tire.

As illustrated in FIG. 1, a detection device 10 comprises a memory 1, a means 2 for determining a current signature and a means 3 for comparing the current signature with the reference signature.

The device also comprises a speed sensor 4 connected to the wheel 5 furnished with a tire. The determination means 2 is connected via at least one of its inputs to the speed sensor 4 and via at least one of its outputs to the comparison means 3. Said comparison means 3 is also connected via one of its inputs to the memory 1 by the connection 8, and transmits via at least one of its outputs a signal to the interface with the driver 11 by means of the connection 9.

The speed sensor 4 comprises a rotating portion and a nonrotating portion. Angle markers are linked to the rotating portion of the sensor and move in succession relative to the nonrotating portion of said sensor. Different interactions may link the angle markers and the nonrotating portion. For example, a magnetic interaction may be used to detect the passage of an angle marker.

When such a marker passes, a rising edge appears in the output signal of the sensor, the amplitude of the signal increasing while the distance between the angle marker and the nonrotating portion reduces. When the marker moves away and the distance increases, a falling edge appears while the amplitude of the signal decreases.

Since the markers are spaced at a constant angle on a complete rotation of the wheel, the generated signal comprises a succession of rising and falling edges. From one rotation to the next, the same markers generate the same oscillations. From one rotation to the next, the signal is the same, exhibiting a periodicity of the signal on one complete wheel rotation.

When the vehicle moves, the speed sensor 4 transmits the oscillating and periodic signal to the determination means 2. The determination means 2 analyzes said oscillating signal and extracts a current signature therefrom. The current signature corresponds to the signal received during a complete rotation of the wheel. The origin of the rotation can be determined by several means, usually by an angle marker different from the other angle markers and making it possible to attribute a physical correspondence between the various angle markers and the oscillations of the signal.

The current signature is then transmitted to the comparison means 3. The comparison means 3 also receives a reference signature stored in the memory 1. Said reference signature is an oscillating and periodic signal of the same nature as the current signature generated by the determination means 2. The reference signature differs from the current signature by the fact that it relates only to the sensor, angle markers and nonrotating portion, and not to the tire or the interactions between said tire and the wheel or the pavement.

The reference signature is independent of the running conditions and the running speed. It is determined in a controlled environment, either on a rolling road or during a running test in controlled conditions.

The comparison means 3 then calculates the difference between the reference signature and the current signature. This difference is characteristic of the inflation state of the tire. Said difference is then compared with a stored threshold level in order to detect whether the tire has been punctured. When a puncture of the tire is detected, a warning signal is transmitted to the means 11 for interfacing with the driver via the connection 9.

A sequence of several phases leads to the puncture. The end of the puncturing object locally compresses the tire. The local pressure increases up to the resistance limit of the tire. When the resistance limit is exceeded, the puncturing object penetrates the tire. When the causes of compression have disappeared, the local pressure returns to a value consistent with the overall pressure of the tire.

The comparison means 3 detects said local increase in pressure preceding the puncturing of the tire according to the signal received from the speed sensor. The comparison means 3 monitors any pressure increase that is above a stored threshold and is limited in time. The more the contribution to the signal from the speed sensor is subtracted, the easier the pressure increase is to detect on the signal from the comparison means. Therefore, only the signal due to the tire is taken into account during detection. The signal, normally of low amplitude, sees its amplitude increase sharply prior to a puncture.

Since the increase is limited in time, it is also possible to locate the puncture by locating the pressure increase that preceded it. For this, the angle markers corresponding to the pressure measurements affected by said pressure increase are located.

Figure 2:
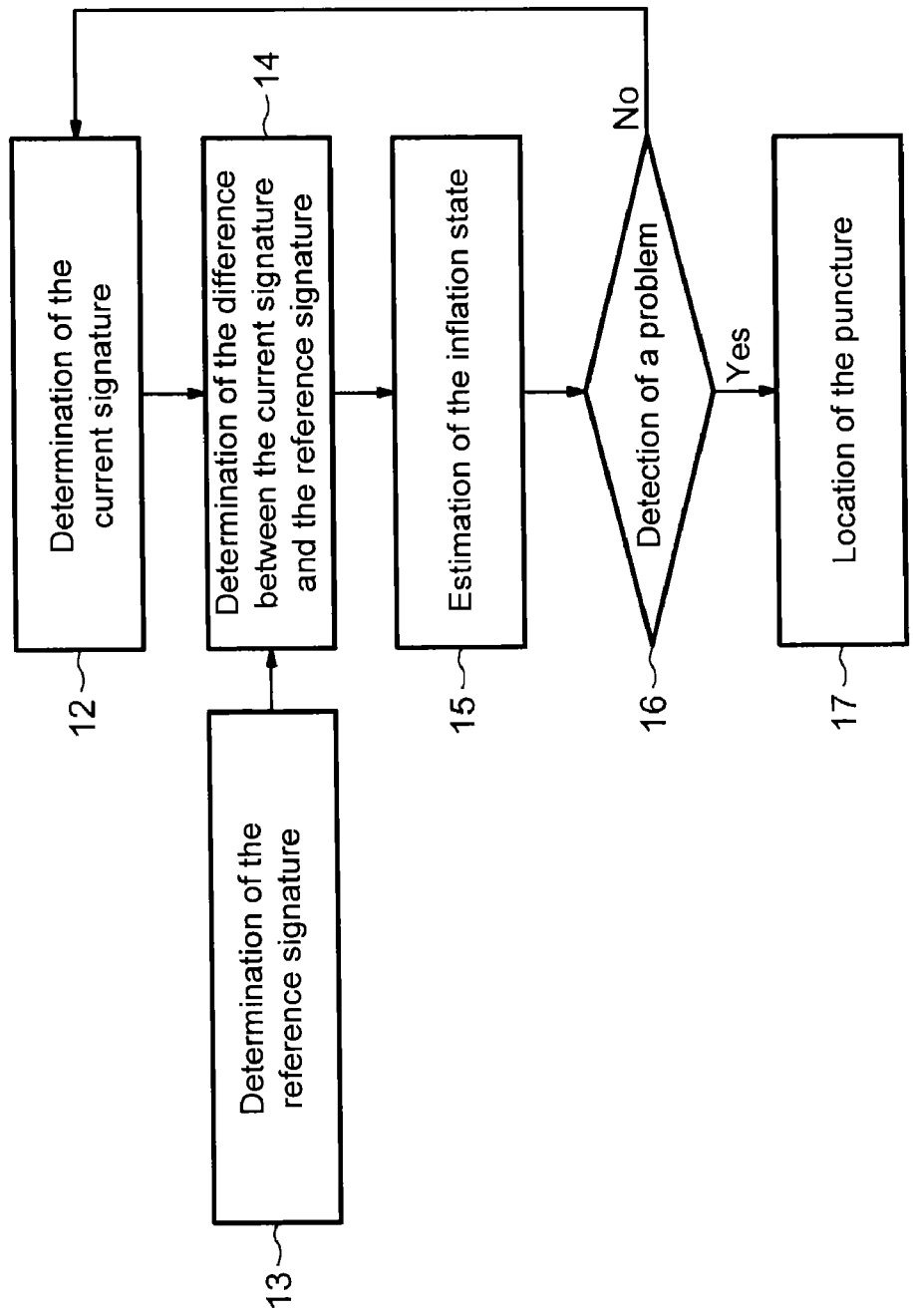
FIG. 2 illustrates the main steps in a method for detecting the inflation state of a tire.

FIG. 2 illustrates the main steps in the method for detecting a puncture and for estimating the inflation. The method begins in step 12 by the determination of the current signature. In step 13, the reference signature is received and compared with the current signature, in step 14, in order to determine the difference between the current signature and the reference signature. In step 15, the inflation state of the tire is estimated according to the difference calculated in step 14. In step 16, the inflation state is monitored using a comparison of the difference calculated in step 14 with a threshold level. If said threshold is exceeded, a puncture is detected and located in step 17. In step 18, the driver is notified of the occurrence of the puncture and of the location of said puncture. If no puncture is detected in step 16, the method begins again in step 12.

From a more general point of view, it is possible to estimate the inflation state of each tire according to the difference between the current signature and the reference signature. In particular, the pressure is estimated in an absolute manner, and not in relation to the pressure of another tire. It is therefore possible to dispense with the limitations inherent in a simultaneous pressure reduction of several tires.

Similarly, since the difference can be calculated in real time, the inflation state of the tire can be estimated and a puncture of said tire can be detected also in real time.

Finally, it is possible to apply the detection method to more complex situations such as for example the estimation of inflation or the detection of punctures applied to studded tires. The distribution of the studs on the surface of a studded tire is uniform and periodic. When such a tire rotates, a localized pressure increase appears on the current signature when one of the studs passes between the tire and the pavement.

By applying the method described above, it is possible to distinguish a wheel fitted with a studded tire from a wheel fitted with an unstudded tire. For this, the signal level is monitored relative to a level determined beforehand. If the signal level is continually above the predetermined level, the tire is studded.

An alternative may be to incorporate the signal due to the studs of the tire into the reference signature. Therefore, the difference between the current signature and the reference signature exhibits a low level. If the tire is not studded, the reference signature does not match and the difference between the reference signature and the current signature is considerable. The level of the difference makes it possible to distinguish a tire that is not studded from a studded tire. Moreover, the rest of the method described above can be applied, including the detection of a blow-out by an isolated increase in the signal level.

Finally, another alternative can be to analyze the frequency spread spectrum of the current signature. By carrying out a Fourier transform, it is possible to obtain a frequency spread of the signal. Since the studs of a tire are distributed at a frequent angular spacing, their contribution to the signal obtained on a wheel rotation is periodic, the period depending on the difference in angle between two markers and on the diameter of the tire. The presence of a contribution having said periodicity can then be used as a means for distinguishing between a studded tire and an unstudded tire.

The invention claimed is:

1. A device for detecting an inflation state of a tire of at least one wheel of a motor vehicle, comprising:

a memory storing a reference signature of a periodic signal corresponding to a predetermined inflation state of the tire and to reference running conditions;

a means for determining a current signature of a periodic signal corresponding to a current inflation state of the tire and to current running conditions; and a means for comparing the current signature with the reference signature to determine a pressure increase within the tire, for comparing the determined pressure increase with a threshold pressure increase, and for outputting a signal indicating that a puncture in the tire is detected when the determined pressure increase is above the threshold pressure increase.

2. The detection device as claimed in claim 1, further comprising:

a sensor that senses rotation speed of the wheel, including angle markers and a means for detecting the angle markers, wherein the means for determining a current signature further determines the current signature as a function of a signal received from the speed sensor and depending on successive passage of the angle markers.

3. The detection device as claimed in claim 2, wherein the means for comparing between the current signature and the reference signature comprises a device for locating an angular position of the angle markers corresponding to a location of the determined pressure increase.

4. The detection method as claimed in claim 1, wherein the signal indicating that the puncture in the tire is detected is output when the determined pressure increase is above the threshold pressure increase for a limited time.

5. A method for detecting an inflation state of a tire of at least one wheel of a motor vehicle, comprising:

storing a reference signature of a periodic signal corresponding to a predetermined inflation state of the tire and to reference running conditions;

determining a current signature, of a periodic signal corresponding to a current inflation state of the tire and to current running conditions;

determining a difference between the current signature and the stored reference signature to determine a pressure increase within the tire;

comparing the determined pressure increase with a threshold pressure increase; and outputting a signal indicating that a puncture in the tire is detected when the determined pressure increase is above the threshold pressure increase.

6. The detection method as claimed in claim 5, wherein the difference between the reference signature and the current signature is determined by producing a point-to-point difference between the current signature and the reference signature.

7. The detection method as claimed in claim 5, wherein the difference between the current signature and the stored reference signature is determined in real time.

8. The detection method as claimed in claim 5, applied to all of the tires of the vehicle, wherein the difference between the current signature and the stored reference signature is determined for each tire individually.

9. The detection method as claimed in claim 5, applied to a vehicle fitted with studded tires, wherein the reference signature includes contribution of studs of the tire.

10. A device for detecting an inflation state of a tire of at least one wheel of a motor vehicle, comprising:

a memory configured to store a reference signature of a periodic signal corresponding to a predetermined inflation state of the tire and to reference running conditions;

a determination unit configured to determine a current signature of a periodic signal corresponding to a current inflation state of the tire and to current running conditions; and a comparator configured to compare the current signature with the reference signature to determine a pressure increase within the tire, to compare the determined pressure increase with a threshold pressure increase, and to output a signal indicating that a puncture in the tire is detected when the determined pressure increase is above the threshold pressure increase.

11. The detection device as claimed in claim 10, further comprising:

a sensor that senses rotation speed of the wheel, including angle markers and a detection unit to detect the angle markers, wherein, when the comparator detects the puncture in the tire, the determination unit determines a location of the puncture based on an angular position of the angle markers corresponding to an occurrence of the determined pressure increase.

* * * * *